United States Patent [19]
Hardy

[11] 3,818,768
[45] June 25, 1974

[54] NUT AND GEAR ASSEMBLIES FOR USE IN ENGINE STARTER MOTORS

[75] Inventor: William Arthur Hardy, Birmingham, England

[73] Assignee: Joseph Lucas (Industries) Limited, Birmingham, England

[22] Filed: Feb. 9, 1972

[21] Appl. No.: 224,678

[30] Foreign Application Priority Data
Feb. 10, 1971  Great Britain............... 4347/71

[52] U.S. Cl.................. 74/6, 74/7 R, 29/521
[51] Int. Cl.................... F02m 15/06, B21k 25/00
[58] Field of Search............ 74/6, 7 R; 29/521, 511

[56] References Cited
UNITED STATES PATENTS 2,235,121  3/1941  Sekella.................. 74/7 R
2,469,792  5/1949  Buxton et al............. 74/7
2,913,820  11/1959  Barth.................... 29/521

*Primary Examiner*—Allan D. Herrmann
*Attorney, Agent, or Firm*—Holman & Stern

[57]  ABSTRACT

A nut and gear assembly for a vehicle starter motor, in which the gear is secured to one end of a body and the nut is secured to the other end. The nut has a peripheral groove portion and a series of flanges projecting radially beyond the groove and is secured in the body by forcing the flanges into the body until part of the material of the body is displaced into the groove.

3 Claims, 3 Drawing Figures

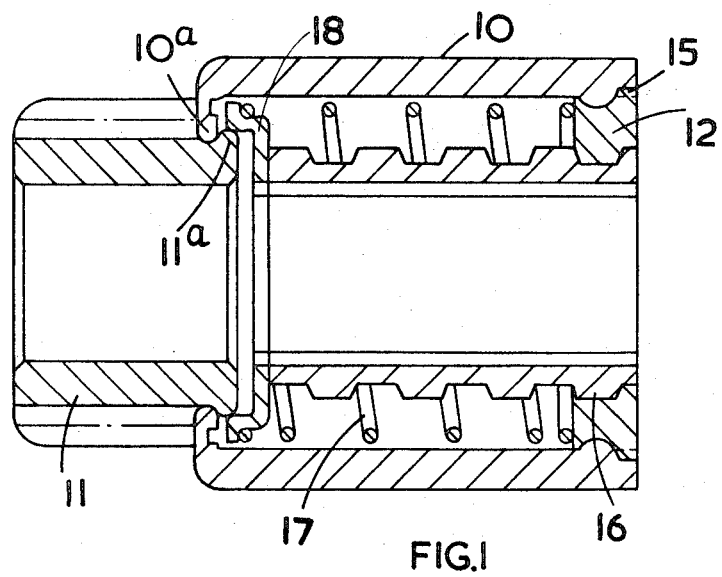
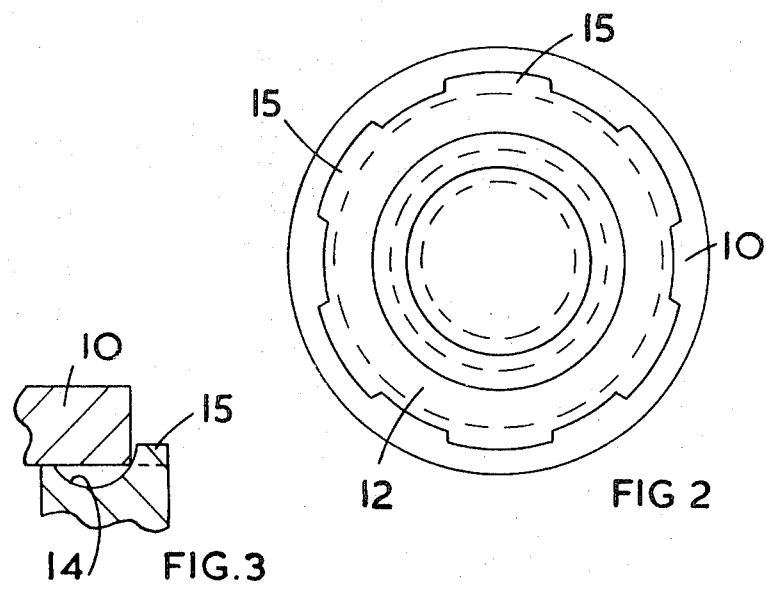

NUT AND GEAR ASSEMBLIES FOR USE IN ENGINE STARTER MOTORS

This invention relates to nut and gear assemblies for use in engine starter motors.

Conventionally a nut and gear assembly comprises a body, a gear secured to one end of the body, and a nut secured to the other end of the body. The body is formed around said other end with a series of notches into which projecting lugs on the nut fit, and the nut is secured in place by peening over portions of the end of the body between said notches.

In accordance with the present invention, the nut is formed with at least one peripheral groove and a plurality of portions projecting radially beyond said groove whereby the nut can be assembled to the body by inserting the grooved end of the nut into the body, so that the projecting portions engage the end of the body, and urging the nut into the body so that body material is displaced by said projecting portions into said groove.

An example of the invention is illustrated in the accompanying drawings, in which:

FIG. 1 is a section through a gear and nut assembly manufactured in accordance with the invention, FIG. 2 is an end view of the assembly, and FIG. 3 is an enlarged fragmentary view illustrating a stem in the manufacture of the assembly.

The assembly shown comprises a body 10 of basically tubular form, a gear 11 secured at one end of the body and a nut 12 secured at the other end of the body. The gear 11 is secured in place by inserting an outwardly directed lip portion 11a on one end thereof into the body and deforming the end 10a of the body 10 using a ring punch so that the end 10a engages the groove defined between portion 11a and the remainder of the pinion.

The nut 12, as shown in FIGS. 2 and 3, has an external diameter such that it will fit into the end of the body 10, and has a peripheral groove 14. On one side of this groove there are a plurality of projecting portions 15, extending to a diameter larger than the internal diameter of the body 10. To assemble the nut 12 with the body 10, the nut is inserted into the body until the projection portions 15 abut the end of the body 10 and the nut 12 is then pressed, or hammered, into the body so that the projection portions 15 bite into the end of the body and displace the material inwardly into the groove 14.

The nut is thereby held against rotary movement relative to the body by projecting portions 15, and against axial movement relative to the body of the inwardly displaced body material in the groove 14.

The assembly also includes, in the body 10, a hollow helix 16 disposed within the body and engaging the nut 12, a helical spring 17 mounted on the helix 16, and a spring cup 18 abutting an end of the spring 17 remote from the nut 12.

The assembly is assembled as follows:

1. Gear 11 secured to body 10 as described above,
2. Spring cup 18 and spring 17 inserted into body 10,
3. Nut 12 secured to body 10 as described above, and
4. Helix 16 screwed into position.

It will be noted that the number of machining operations which have to be carried out on the body, is reduced as compared with the conventional method of manufacture, since no notches have to be machined in the end of the body, to receive the projections on the nut.

In a modification (not shown), there are provided one or more grooves each of which only extend partly around the periphery of the nut. Most advantageously, a plurality of equi-angularly spaced grooves or flats are provided in the periphery of the nut.

I claim:

1. A nut and gear assembly comprising a body, a gear secured to one end of said body, a nut secured to the other end of said body, at least one external groove on said nut, a plurality of portions of said nut projecting outwardly beyond said at least one external groove, said at least one external groove being disposed between said portions of said nut and said gear, said portions of said nut biting into said body so as to prevent relative rotation between said nut and said body and so as to define displaced portions on said body extending into said at least one external groove to prevent relative rotation between said nut and said body.

2. The assembly according to claim 1, wherein said gear is provided at one end with an outwardly directed lip defining a groove between said lip and the remainder of said gear, and an inwardly directed portion at the said one end of said body engages said groove on said gear.

3. The assembly according to claim 1, wherein, mounted within said body, are a hollow helix meshing with said nut, a helical spring mounted on said hollow helix and abutting said nut at one end, and a spring cup abutting an end of said helical spring remote from said nut.

* * * * *